United States Patent Office 2,716,972
Patented Sept. 6, 1955

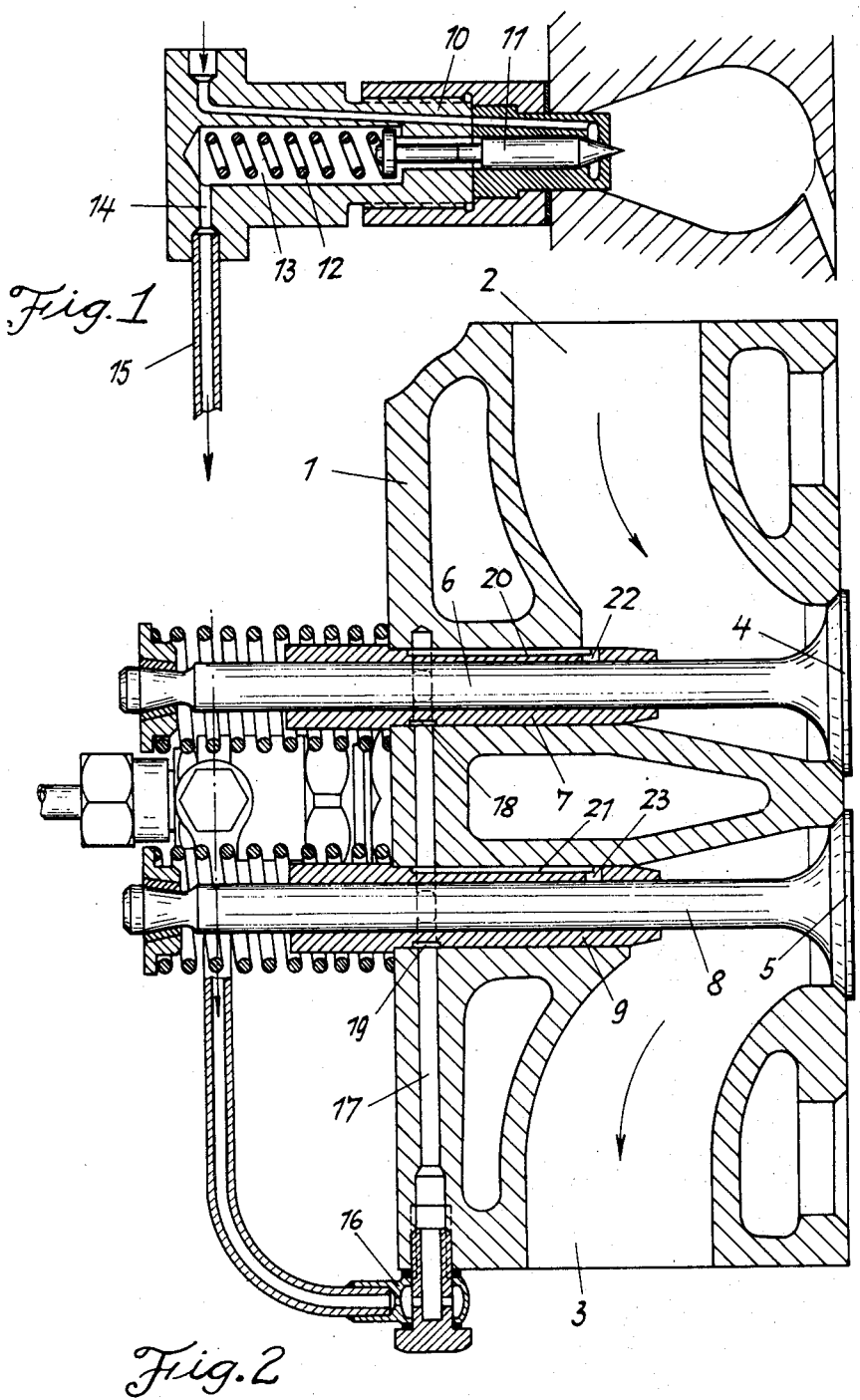

2,716,972
LUBRICATION OF ENGINE VALVES BY FUEL LEAKAGE

Paul Farny, Ilvesheim, and Ernst Weidmann, Weinheim, Germany

Application January 29, 1953, Serial No. 333,872
Claims priority, application Germany February 4, 1952

6 Claims. (Cl. 123—90)

The invention deals with the lubrication of the valve stems in internal combustion engines, particularly in valve-controlled diesel engines.

An object of the invention is to provide a device for lubricating the valve stems of internal combustion engines.

Another object of the invention is to positively lubricate the valve stems in internal combustion engines.

According to the invention the leaking oil of the injection valves is used for lubricating the valve stems. Owing to the invention a waste of the leaking oil of the injection valves is prevented.

In four-stroke cycle diesel engines, according to the invention, the leaking oil is first conducted to the stem of the exhaust valve and from there to the stem of the inlet valve. The advantage resulting therefrom consists in that the hot exhaust valve, which according to the existing working conditions, tends to stick more or less, but at all events more than the inlet valve, is first lubricated. By lubricating a valve with pure fuel oil a sticking of the same will be avoided more safely than by applying the usual lubricant consisting of one part of fuel oil and one part of lubricating oil. The materials for the valve stems and valve bushings will be chosen according to the lubricating properties of the novel lubricant.

According to a preferred embodiment of the invention the end of the feeder adjacent to the stem of the inlet valve is in communication with the air inlet port leading to the cylinder of the engine so that, owing to the reduction of pressure during the admission stroke, the leaking oil will be drawn off from the feeding toward the stem of the inlet valve, and also any excessive amount of leaking oil will be drawn off by the working piston of the engine, and thus prevented from being wasted so as to be efficiently used in the working cylinder.

In the accompanying drawing an embodiment according to the invention is illustrated by way of example. The figures show two sections through the cylinder head of a diesel engine of pre-chamber type.

Fig. 1 shows a section through the inlet and outlet ports, and Fig. 2 a section through the injection valve.

In the cylinder head 1 (Fig. 2) is provided with an inlet port 2 and an outlet port 3 for admitting air to the working cylinder and for discharging the waste gas from the working cylinder, respectively. The inlet port 2 is connected with the cylinder bore by a spring-loaded inlet valve 4 and the outlet port 3 by a spring-loaded outlet valve 5. The stem 6 of the inlet valve 4 is guided in a bushing 7, and the stem 8 of the outlet valve 5 in a bushing 9 projecting into corresponding bores in the cylinder head 1 and being secured there.

The fuel injection valve 10 (Fig. 1) has a nozzle needle 11, which at the injecting of fuel is lifted off its seat by the pressure of the fuel against a spring 12. The spring 12 is arranged in a chamber 13 of the valve casing. In the chamber 13 more or less leaking oil appears along the needle guide of the injection valve 10, which, according to the invention, is used for lubricating the valve stems 6 and 8 shown in Fig. 2 of the inlet and outlet valves. To this end the chamber 13 is in communication through a passage 14 with the leaking oil piping 15 leading to the cylinder head 1 (Fig. 2) and ending there in a specially designed duct or nipple 16. Through a passage 17 the nipple is in communication with the bushings 7 and 9 and with the stems 6 and 8 of the valves 4 and 5. In the outer surfaces of the bushings 7 and 9 annular grooves 18 and 19 are provided and, moreover, flattenings or recesses 20 and 21 originating in them, which together with the wall of the cylinder head 1 form channels in which the leaking oil can enter. These channels of the valve stem guides are communicating by one or several openings or holes 22, 23 with the valve stems 6 and 8 so that the leaking oil can get there.

As will be seen from the drawing, the recess 21 is separated from the outlet port 3, whereas the recess 20 is in communication with the inlet port 2 so that excess leaking oil is carried off by the air taken in and conveyed into the working cylinder.

From the invention results the advantage that the leaking oil of the injection valve is properly used, and a good lubrication of the valve stems is ensured.

Apart from valve stems, of course, other moving parts of the internal combustion engine may similarly be lubricated by leaking oil.

What is claimed is:

1. A valve-controlled internal combustion engine with fuel injection, comprising in combination at least one injection valve lubricated by a lubricating liquid leaking partly from said injection valve, at least one valve having a valve stem, means for lubricating at least said valve stem of said valve by the leaking part of the liquid lubricating said injection valve, and an oil leakage pipe leading from said injection valve to said valve stem.

2. An engine as claimed in claim 1, said engine having two of said valves designed as an inlet valve and an outlet valve, respectively, said oil leakage pipe leading first to the stem of said outlet valve.

3. An engine as claimed in claim 1, a bushing guiding said valve stem, said bushing having a wall portion, and a channel extending along the outer circumference of said bushing of said valve stem, said channel having an opening leading from said channel to said valve stem through said wall portion of said guide bushing.

4. An engine as claimed in claim 3, said valve being designed as an injection valve having an injection valve stem, a cylinder head and a duct arranged in said cylinder head, said oil leakage pipe coming from said injection valve and ending in said duct arranged in said cylinder head, said duct being in communication with said channel of said bushing of said injection valve stem.

5. An engine as claimed in claim 4, another of said valves being designed as an outlet valve having an outlet valve stem, a bushing guiding said outlet valve stem, said bushings guiding said inlet valve and outlet valve stems, being provided with at least one of said channels extending along the outer circumference of said bushings, said channels having first ends being in communication, respectively, with passages in said cylinder head, the second ends of said channels leading to said valve stems, respectively, by way of openings.

6. An engine as claimed in claim 5, and an air inlet port, said channel extending along the outer circumference of said bushing of said outlet valve stem being in communication with said air inlet port.

References Cited in the file of this patent

UNITED STATES PATENTS

| 1,356,914 | Fekete | Oct. 26, 1920 |
| 1,596,194 | Lang | Aug. 17, 1926 |
| 2,057,123 | Ullrich | Oct. 13, 1936 |
| 2,627,319 | Kaufman | Feb. 3, 1953 |

FOREIGN PATENTS

| 232,482 | Germany | Mar. 16, 1911 |